May 28, 1957 V. H. ARDIA 2,794,133
ROTOR CENTERING DEVICE FOR A GENERATOR
Filed April 2, 1953
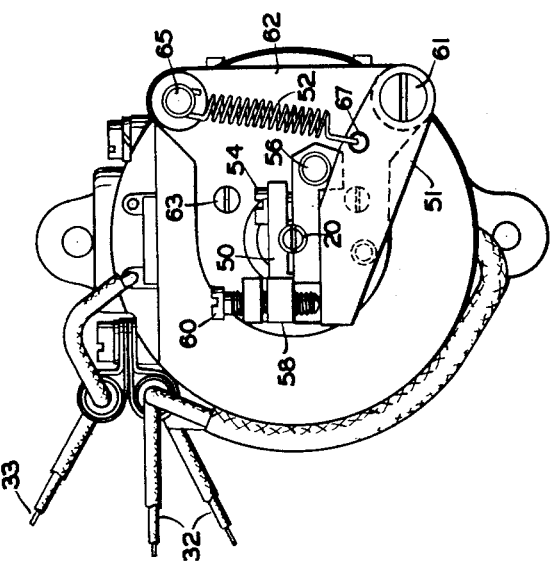
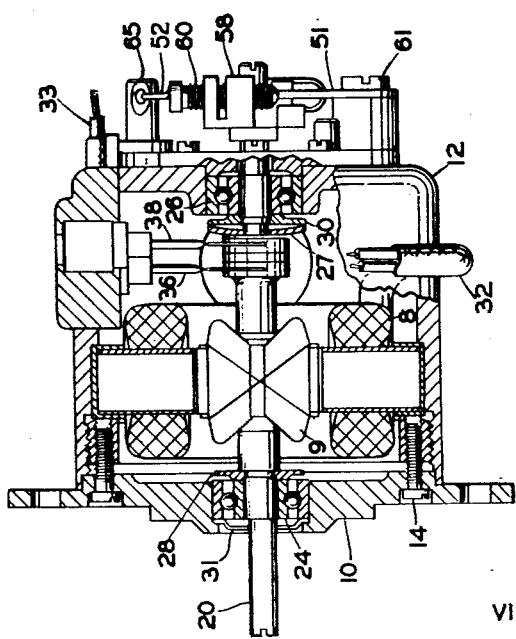
INVENTOR.
VINCENT HENRY ARDIA
BY
*Oscar B Brumback*
ATTORNEY

United States Patent Office 2,794,133
Patented May 28, 1957

2,794,133

ROTOR CENTERING DEVICE FOR A GENERATOR

Vincent H. Ardia, Franklin Lakes, N. J., assignor to Bendix Aviation Corporation, Teterboro, N. J., a corporation of Delaware Application April 2, 1953, Serial No. 346,418

2 Claims. (Cl. 310—15)

This invention relates generally to centering apparatus and more particularly to apparatus for restoring an electrical signal producing device to a normally centered or null position.

Conventional two part signal generators in servosystem develop a signal for operating a servomotor when one part is moved from a null position relative to the other part. This null position is usually the centered position of the signal generator.

In copending application Serial No. 154,567, filed April 7, 1950, by Paul A. Noxon and which is assigned to the assignee of the present invention, a centering device is described which consists of two pivotally mounted arms that are interconnected by a spring and that straddle a fixed pin. A projection on the generator will displace one arm from the fixed pin when an external torque angularly displaces the generator from a null position. The fixed pin meanwhile will limit the motion of the other arm. The tension of the interconnecting spring will return the arm and, therefore, the signal generator to a center position when the torque is removed.

Although the centering device of the above noted application worked well, several disadvantages were noted. The pin, the projection, and the arms were required to be made with precision so that the arms would strike both the pin and the projection simultaneously. Also, adjustments of the centering device to compensate for the shifts in the null position of the signal generator which frequently occurred due to random conditions such as shocks and vibration were difficult to make.

An object of the present invention, therefore, is to provide a novel centering device of simple design and with few moving parts.

Another object is to provide a novel device for centering one member with respect to another in which adjustments for a change in center location are easily made.

A further object is to provide a novel centering device which does not require precision made parts.

The above and other objects and advantages of the invention will appear more fully hereinafter from a consideration of the description which follows when taken together with the accompanying drawing wherein one embodiment of the invention is illustrated. It is to be expressly understood, however, that the drawing is for the purpose of illustration and description only and is not designed as a definition of the limits of the invention.

In the single sheet of drawing wherein like parts are numbered alike:

Figure 1 is an elevational view of a signal generator and the novel centering device of the present invention with sections broken away; and Figure 2 is a plan view of the signal generator and novel centering device shown in Figure 1.

The signal generator of Figure 1 may be a conventional type of inductive device in which a fixed stator winding 8 and an inductively coupled relatively movable rotor winding 9 are enclosed in a housing. The housing may consist of two parts: a lower portion 10 secured to an upper portion 12 by suitable means such as bolts 14.

To provide for relative movement of the stator and rotor, the stator windings 8 are fixed to the housing while the rotor winding 9 is mounted on a shaft 20 which is journalled in the housing by bearings 24 and 26. A flexible washer 27 takes care of thrusts on the rotor, and dust washers 28 and 30, and shield 31 keep foreign matter out of the housing. Alternating current is applied to the stator windings by way of conduit 32, and the signal from the rotor winding is applied to conduit 33 by way of a pair of brushes 36 and 38.

Rotor 9 is normally at a null position with respect to the resultant field of the stator winding, that is, its poles are perpendicular to the resultant field of the stator windings 8 so that no voltage is induced in the rotor winding although the stator winding is energized. When a turning of shaft 20 displaces the rotor winding angularly relative to the stator winding, a signal corresponding in amount to the extent of the displacement of the rotor from the null position and in phase to the direction of displacement is induced in the rotor winding.

The novel centering device of the present invention, Figure 2 is comprised generally of a driving member 50, a lever 51 and a tension spring 52. Driving member 50 is movable with shaft 20 to displace lever 51 against the tension of spring 52.

Driving member 50 is a bifurcated bracket secured to shaft 20 by a suitable means such as a screw 54. Driving member 50 carries two projecting members, a pin 56 and a flange 58. Pin 56 directly engages lever 51 while flange 58 engages the lever 51 through a bolt 60 threaded in the flange 58. Lever 51 pivots on a suitable means such as pin 61 which projects from a plate 62 that is suitably secured to housing 12 as by screws 63. Tension spring 52 has one end fixed to plate 62 at pin 65 and the other end fixed at aperture 67 to lever 51.

As rotor 9 is displaced from its center position in a counterclockwise direction, bolt 60 engages lever 51 and correspondingly displaces the lever. As soon as the torque on shaft 20 is removed, lever 51 due to the biasing action of spring 52 urges bolt 60 in a clockwise direction until the lever 51 strikes both bolt 60 and pin 56. At this time, rotor 9 is in its original centered or null position. In a similar manner, when the rotor is displaced in a clockwise direction, pin 56 displaces lever 51. When the torque is removed, spring 52 pulls lever 51 in a clockwise direction until the lever engages both pin 56 and bolt 60. At this time, the rotor is again in its center position. In each case, i. e., whether bolt 60 or pin 56 displaces the lever 51, the lever 51 is always displaced in a counterclockwise direction. Each time the spring 52 returns the lever to centered position in a clockwise direction.

It can be seen, compensation can be easily made for any shift in the null position of the inductive device due to vibration or shock. Merely threading bolt 60 in or out of flange 58 shifts the angular position of the shaft at which lever 51 engages both pin 56 and bolt 60. Thus, centering adjustments can be quickly and easily made.

The foregoing has presented a novel centering device for electrical signal generators in which centering adjustments can be quickly and conveniently made. The few moving parts of the novel centering device do not need to be precision made.

Although but one embodiment of the invention has been illustrated and described in detail, it is to be expressly understood that the invention is not limited thereto. Various changes can be made in the design and arrangement of parts without departing from the spirit and scope of the invention as will now be understood by those skilled in the art.

I claim:

1. A return mechanism for returning a movable member which is mounted for angular movement relative to a fixed member to a predetermined position, comprising a third member pivotally mounted for angular motion relative to said fixed member, a driving member movable about a center with said movable member and having first engaging means thereon for engaging said third member upon angular movement of said movable member in one direction and second engaging means thereon for engaging said third member upon angular movement of said movable member in a reverse direction, said first and second engaging means being spaced with respect to said center whereby both means engage said third member at said predetermined position, and one of said engaging means including adjusting means for changing the angle of said movable member when said engaging means both engage said third member.

2. A signal generator comprising a housing, a stator in said housing, a rotor in said housing and movable angularly relative to said stator, a lever pivotally mounted on said housing for angular motion relative thereto, a bracket carried by said rotor having a first means thereon for engaging said lever upon angular movement of said rotor in one direction and a second means for engaging said lever upon angular motion of said rotor in a reverse direction, said first and second means being separated on said bracket so that both engage said lever at a predetermined position, adjusting means on one of said first and second means for changing said predetermined position, and a spring fixed to said housing and lever for urging said lever into engagement with said first and second means.

References Cited in the file of this patent

UNITED STATES PATENTS

| 2,361,760 | Noxon | Oct. 31, 1944 |
| 2,462,594 | Beal | Feb. 22, 1949 |

FOREIGN PATENTS

| 151,355 | Germany | May 16, 1904 |
| 235,799 | Switzerland | May 1, 1945 |